RECORD CHANGER SPINDLE

Original Filed April 5, 1965

Inventor
Gerald H. Freier
By Brown, Jackson,
Boettcher & Dienner Attys.

RECORD CHANGER SPINDLE

Original Filed April 5, 1965

Inventor
Gerald H. Freier
By Brown, Jackson,
Boettcher & Dienner Attys.

Inventor
Gerald H. Freier
By Brown, Jackson, Boettcher & Dienner Attys.

United States Patent Office 3,442,514
Patented May 6, 1969

3,442,514

RECORD CHANGER SPINDLE

Gerald H. Freier, Benton Harbor, Mich., assignor to V-M Corporation, Benton Harbor, Mich., a corporation of Michigan

Continuation of application Ser. No. 445,381, Apr. 5, 1965. This application Dec. 11, 1967, Ser. No. 689,727
Int. Cl. G11b *17/10*
U.S. Cl. 274—10 17 Claims

ABSTRACT OF THE DISCLOSURE

Record changer spindle having vertically extending slots down to the turntable and through which extend fingers providing a solid shelf support for records stored about the upper slotted portion of the spindle, said spindle further containing a carrier which moves vertically therein by rotation of one of a pair of telescoping threaded members, the fingers being pivoted to said carrier such that they are retractable within the spindle through planes spaced parallel to the spindle axis when they engage the turntable or the centerhole of a record supported thereon, the carrier having means which resiliently hold the fingers in their record supporting extended position and pins on the carrier cooperating with oversized holes in the fingers for limiting pivotal movement of the fingers.

This case is a continuation of application Ser. No. 445,381, filed Apr. 5, 1965, now abandoned.

The present invention relates to an improved center spindle for a record changer. More specifically, the invention relates to a record changer center spindle of the self-supporting type whereby a stack of records to be played is supported on an upper storage portion of the spindle without need for an overlying support arm or the like in order to stabilize the records. The center spindle of the invention includes primary record supporting means comprising a plurality of supporting fingers which normally project outwardly through slots in a spindle body in order to support a stack of records on the upper storage portion of the spindle and which are movable downwardly to release the lowermost record in the stack to a turntable for playing. The center spindle further includes secondary record supporting means for supporting the remainder of the record stack on the upper storage portion of the spindle when the primary supporting means is withdrawn to lower the bottom record to the turntable. In accordance with a preferred embodiment of the invention to be described herein, the primary record supporting fingers lower the bottom record in a stack in a controlled manner all the way to the turntable before releasing the record.

It is an object of the present invention to provide an improved record changer spindle of the self-supporting type.

A further object of the invention is to provide a center spindle for a record changer having improved primary record supporting fingers which normally support a stack of records on an upper storage portion of the spindle.

Another object of the invention is to provide a record changer center spindle having improved secondary supporting means for supporting the remainder of the record stack when the primary supporting fingers are withdrawn to lower the bottom record to the turntable.

A still further object of the invention is to provide improved mechanism including a screw drive for controlling the raising and lowering of the primary record supporting fingers.

An additional object of the invention is to provide a record changer spindle as last above-mentioned wherein the primary record supporting fingers lower the bottom record of a stack substantially the entire distance to the turntable before releasing the record.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

Figure 3:
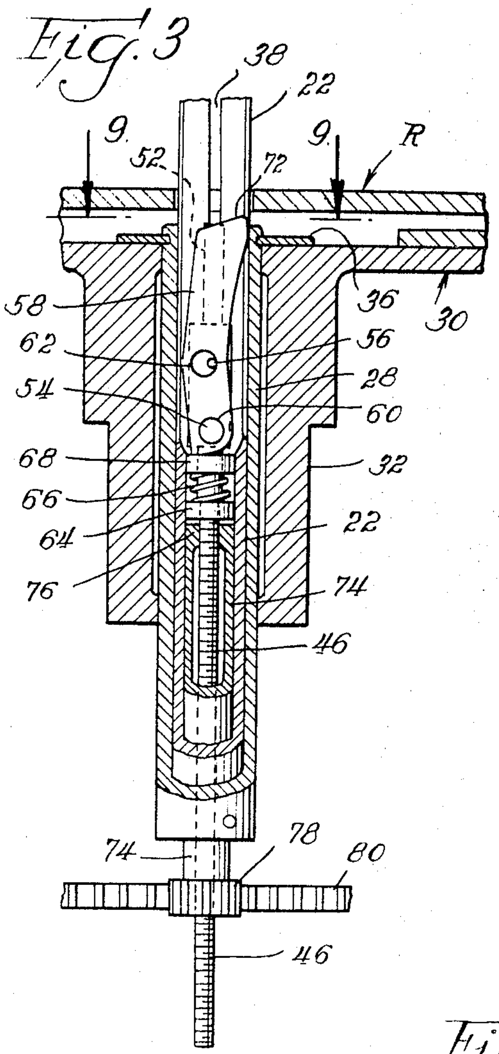
FIGURE 3 is a fragmentary vertical sectional view showing the primary record supporting fingers at the lower end of their stroke where they are retracted into the spindle body due to engagement with the turntable thereby to dispose a record on the turntable for playing.
Figure 4:
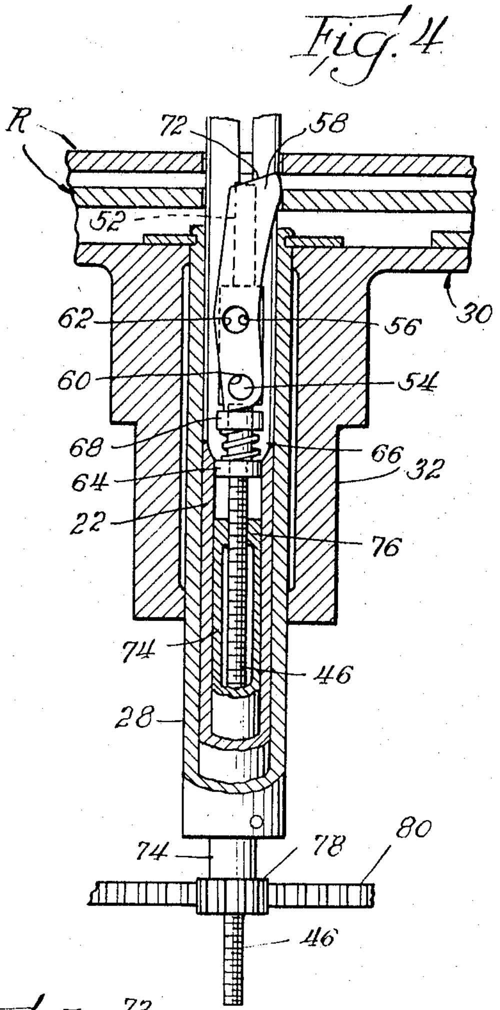
FIGURE 4 is a view similar to FIGURE 3 showing the primary supporting fingers as they lower still another record to the turntable for playing and illustrating the manner in which the supporting fingers are cammed inwardly to a retracted position within the spindle body by the record previously lowered to the turntable in order to release a further record to the turntable.
Figure 10:
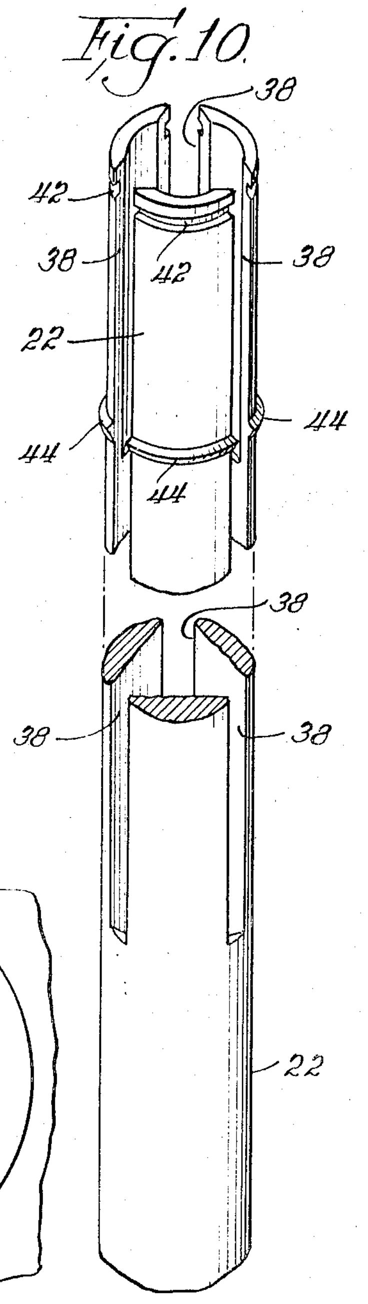
Figure 9:
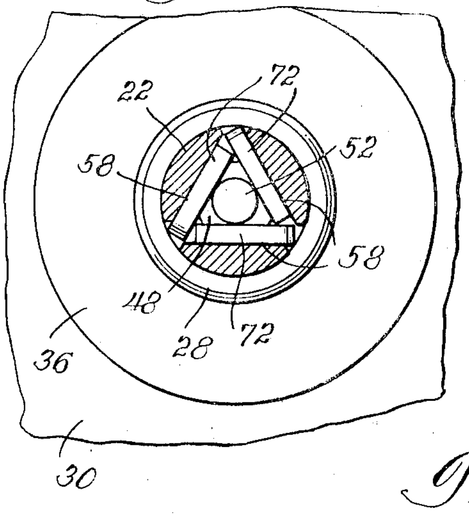

FIGURE 9 is an enlarged fragmentary horizontal sectional view taken substantially along the line 9—9 of FIGURE 3 showing the primary record supporting fingers in their retracted positions; and FIGURE 10 is an enlarged detail perspective view, partly broken away, showing a slotted spindle body of the record changer spindle of the present invention including an expandable upper end portion which comprises a component of the secondary record supporting means.

Figures 1, 2:
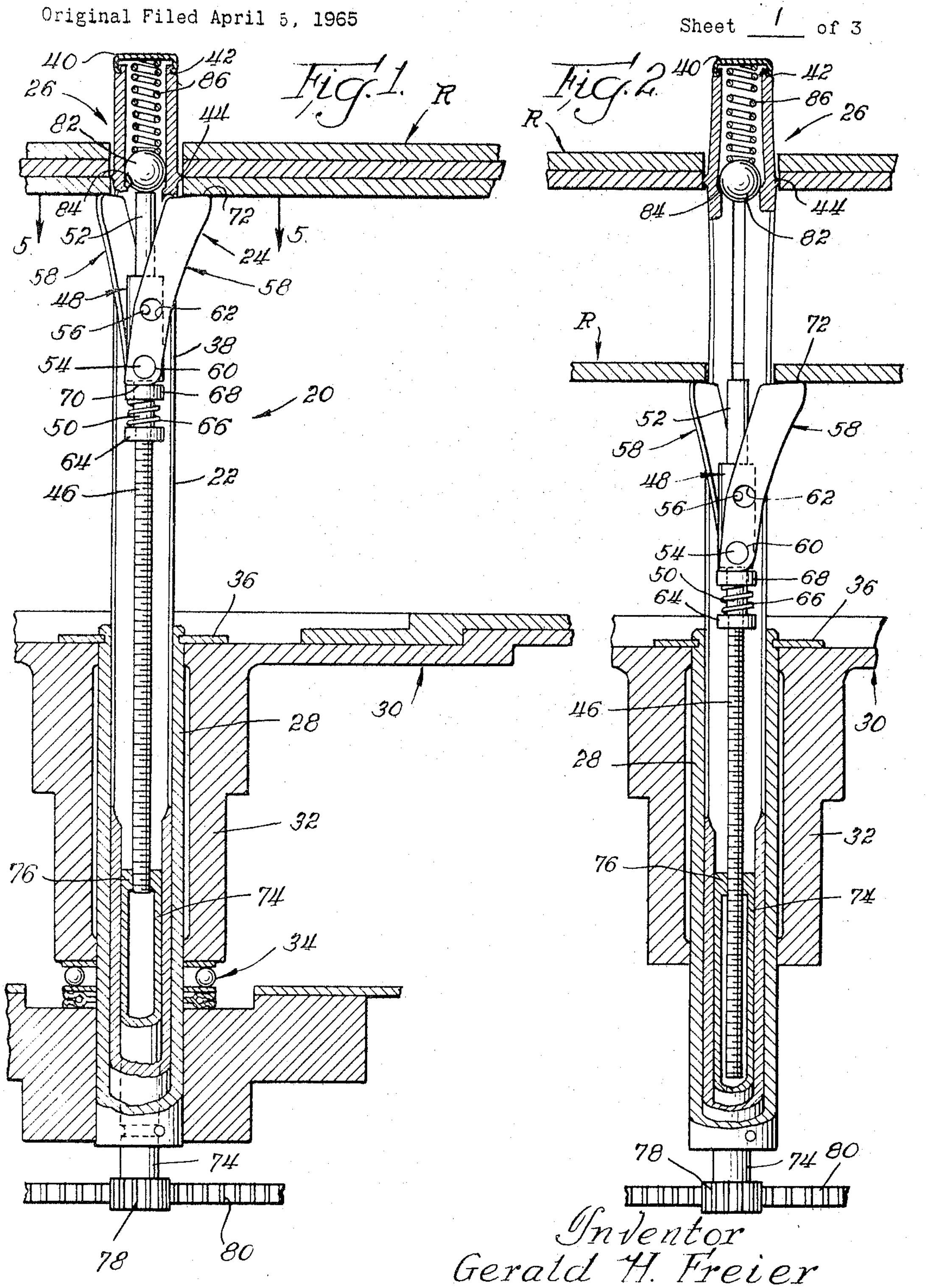
FIGURE 1 is a fragmentary vertical sectional view showing a record changer center spindle of the self-supporting type constructed in accordance with the present invention, primary record supporting fingers being shown in normal operative position to support a stack of records, and secondary record supporting means being shown in normal inoperative retracted position.
FIGURE 2 is a view similar to FIGURE 1 showing the primary supporting fingers in a partially lowered position as during the lowering of the bottom record in the stack to the turntable, and showing the secondary record supporting means in an operative position for supporting the remainder of the stack on the upper storage portion of the spindle.

Referring now to the drawings, FIGURE 1 shows a record changer center spindle 20 comprising a spindle body 22, primary record supporting means 24 for normally supporting a stack of records R on an upper storage portion of the spindle, secondary record supporting means 26 for supporting the remainder of the record stack when the primary supporting means is withdrawn to lower the bottom record of the stack to the turntable, and a tubular spindle base member 28 which functions as a bearing post for a turntable 30 having a downwardly projecting sleeve portion 32 which encompasses the spindle base 28 and rotates thereabout. A thrust bearing 34 is provided at the underside of the turntable sleeve 32, and a C-washer 36 at the upper end of the spindle base 28 serves as a retainer for the turntable 30.

As best shown in FIGURE 10, the spindle body 22 is provided with three equally spaced vertical slots 38 which extend from the extreme upper end of the spindle body down to a horizontal plane at or beneath the level of the turntable 30. Thus, the three vertical slots 38 extend for substantially the entire length of that portion of the spindle body 22 which projects above the turntable 30. FIGURE 1 shows a cap 40 which is secured to the top of the spindle body 22 by having a skirt portion thereon crimped into an annular groove 42 formed around the upper end of the spindle body. In addition, an annular projecting rib 44 is formed around the slotted spindle body 22 on the upper record storage portion thereof. The annular rib 44 comprises a component of the secondary record supporting means 26 and as shown in FIGURE 1 is disposed at the height of the next-to-lowermost record in a stack of record R supported on the primary record supporting means 24.

Figure 7:
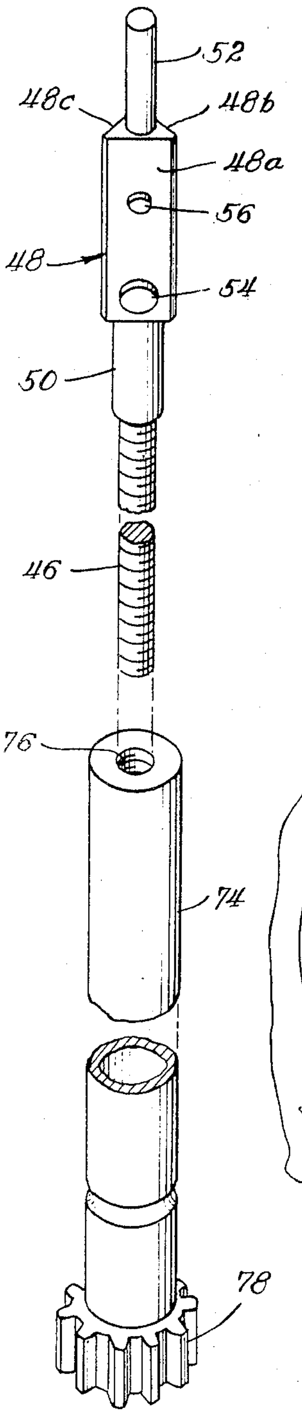
FIGURE 7 is an enlarged perspective view, partly broken away, showing an internally threaded drive tube having a pinion thereon and an externally threaded rod having a finger carrier thereon, such components constituting mechanism for raising and lowering the primary record supporting fingers.

An externally threaded rod 46 (see FIGURES 1 and 7) is disposed within the spindle body 22 and is vertically movable therein. At the upper end of the threaded rod 46 there is provided a finger carrier member 48 which in the embodiment described is triangular in horizontal cross section. An unthreaded rod portion 50 is provided immediately beneath the finger carrier 48 and such rod portion is slightly larger in diameter than the threaded rod portion 46. In addition, a rod extension 52 projects upwardly from the top of the finger carrier 48, and as will be seen hereinafter the rod extension 52 serves as an actuator for the secondary record supporting means 26. As best shown in FIGURE 7, the finger carrier 48 includes three sides **48*a*, 48*b*, and 48*c*, and on the side 48*a* there are provided a relatively large stud 54 located near the lower end of the finger carrier and a smaller stud or pin 56 spaced above the stud 54. It will be understood that the other two carrier sides 48*b* and 48*c* are provided with projecting studs identical to the studs 54 and 56 herein described with reference to the carrier side 48*a***.

Figure 8:
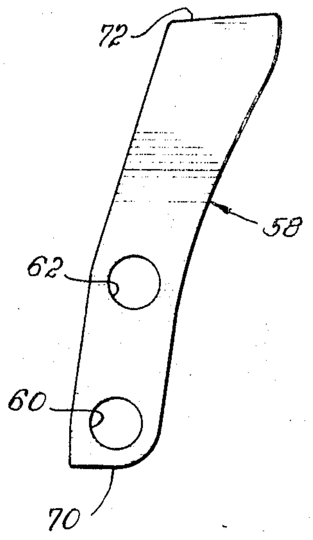
FIGURE 8 is an enlarged detail elevational view of one of the primary record supporting fingers.

FIGURE 8 shows a primary record supporting finger 58 having spaced apertures 60 and 62 formed therein for receiving the studs 54 and 56 formed on the finger carrier 48. The finger 58 is assembled on the carrier 48 with the stud 54 projecting through the aperture 60. The aperture 60 is slightly larger than the stud 54 so as to receive the same, and in this manner the finger 58 is pivotally mounted on the stud 54. The pin or stud 56 is substantially smaller in diameter than the upper aperture 62 into which it projects, and as can be seen in FIGURE 1 the pin 56 serves as a stop to limit the amount which the finger 58 can pivot outwardly from the spindle body 22.

It will be understood that in the embodiment being described three of the primary record supporting fingers 58 are provided, one being mounted on each of the carrier sides **48*a*, 48*b* and 48*c*, and the fingers are aligned respectively with the three vertical slots 38 in the spindle body 22 so that when the fingers are in their extended operative positions they project outwardly through the slots 38 to the extent permitted by the pins 56 and apertures 62. A nut 64 is threaded on the rod portion 46 at the upper end thereof so as to be disposed immediately beneath the rod portion 50, and the nut 64 supports one end of a compression spring 66 which surrounds the rod portion 50. An annular collar 68 is slidable on the rod portion 50 and is disposed above the spring 66 so as to be urged upwardly thereby against the undersides 70 of each of the three pivotally mounted supporting fingers 58. The collar 68 by continuously pressing up on the undersides 70 of the three primary record supporting fingers 58 urges the latter toward their fully extended operative positions as shown in FIGURE 1, and in this manner the fingers 58** are spring-loaded outwardly.

Figure 5:
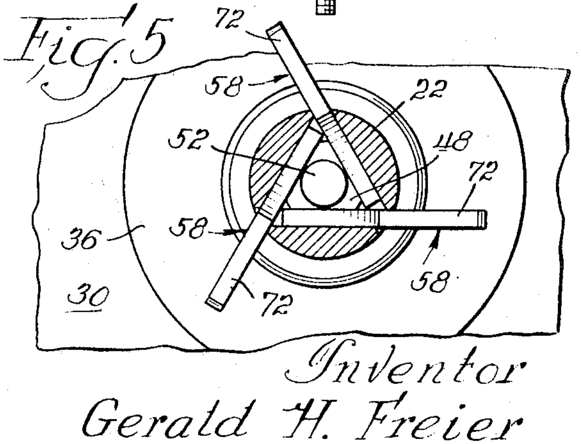
FIGURE 5 is an enlarged horizontal sectional view taken substantially along the line 5—5 of FIGURE 1 showing the primary record supporting fingers in their operative extended positions.

It will be seen that the primary supporting fingers 58 are of sufficient width across their upper supporting surfaces 72 so that even when fully extended as shown in FIGURE 1 each supporting surface 72 provides a solid supporting shelf which reaches inwardly to the spindle body 22. Because the supporting fingers 58 are provided with upper supporting surfaces 72 of such substantial width, it will be understood that there would not be space within the spindle body 22 to retract the fingers if each was mounted in a plane which intersected the spindle axis. However, as shown in FIGURES 5 and 9, by mounting the fingers 58 each on a corresponding side of the triangular carrier 48, each finger is supported in a plane which is parallel to the spindle axis and spaced therefrom, and thus when the three fingers are retracted as shown in FIGURE 9 they generally define a triangle. Such an arrangement permits full retraction of all three supporting fingers 58 within the spindle body 22 as shown in FIGURES 3 and 9 even though each finger has an upper supporting shelf 72 of a width which substantially exceeds the radius of the spindle body 22.

In order to lower a record R to the turntable 30 for playing it is necessary to lower the finger carrier 48 which is carried on the upper end of the rod 46, and this operation is accomplished by the lowering of the rod 46. The lower end of the threaded rod 46 extends into a drive tube 74 (see FIGURES 1 and 7) which is disposed into the lower end of the spindle body 22 and is rotatable therein. The drive tube 74 has an internal flange or lip 76 at its upper end which is threaded so as to cooperate with the threads on the rod 46, and it will thus be understood that rotation of the drive tube 74 produces vertical movement of the rod 46 and primary supporting fingers 58. That is, the fingers 58 are carried on the upper end of the rod 46 and project out through the slots 38 in the spindle body 22, and thus the rod 46 does not rotate within the spindle body 22. The drive tube 74 however does rotate within the spindle body, and rotation in one direction will raise the rod 46 while rotation in the opposite direction will lower the rod 46. The lower end of the drive tube 74 carries a pinion 78 which engages with a rack member or gear segment 80. The rack 80 moves to the left and to the right as viewed in FIGURE 1 in order to lower and raise the threaded rod 46 and primary supporting fingers 58. Means (not shown) is provided for moving the rack 80 during a record change cycle in order to lower to the turntable 30 the bottom record in a stack of records supported on the upper storage portion of the spindle 20 by the primary supporting fingers 58.

When the primary supporting fingers 58 are lowered, as shown for example in FIGURE 2, the upper end of the spindle body 22 is expanded so as to support all but the lowermost record in the stack. In order to accomplish this function, a steel ball 82 is disposed within the upper end of the spindle body 22 immediately above a reduced diameter portion defined by an annular shoulder 84 (see FIGURE 6). The annular shoulder 84 is located proximate the height of the external annular rib 44 formed on the outside of the spindle body, and the steel ball 82 is urged downwardly in the spindle body by a compression spring 86 which extends between the cap 40 and the ball. When the threaded rod 46 and primary supporting fingers 58 are in their upper positions as shown in FIGURE 1, the rod 52 which projects up from the finger carrier 48 will engage the underside of the ball 82 and maintain the latter in a raised position wherein it is slightly above the shoulder 84. In the raised position of the ball 82 the latter does not expand the spindle body 22 and thus the upper end of the spindle body assumes a collapsed or normal position, as shown in FIGURE 1 and in solid lines in FIGURE 6, in which position the external annular rib 44 does not engage against the record adjacent thereto.

However, when the rod 46 and primary supporting fingers 58 are lowered as shown in FIGURE 2, the rod portion 52 moves away from the ball 82 and the latter is thus moved downwardly against the annular shoulder 84 by the force of the compression spring 86.

Figure 6:
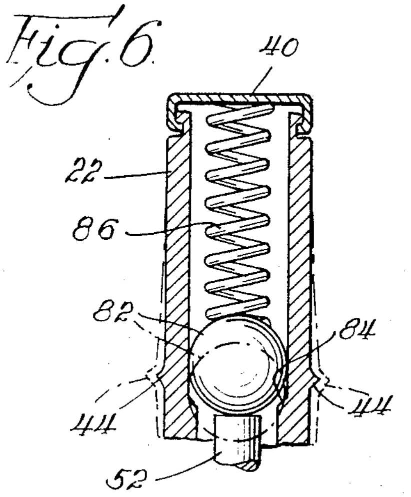
FIGURE 6 is an enlarged fragmentary vertical sectional view of the upper end of the record changer spindle showing the secondary record supporting means in solid lines in its normal inoperative position and in dash lines in its expanded record supporting position.

The downward movement of the ball 82 against the shoulder 84 expands the upper end of the spindle body 22 as indicated in dash lines in FIGURE 6 so as to engage the annular rib 44 against the periphery of the centerhole of the next-to-lowermost record in the stack of records on the upper storage portion of the spindle. In this manner, only the bottom record in the stack will be lowered with the primary supporting fingers 58, and the remainder of the stack will be retained by expansion of the annular rib 44. It will be understood that the expansion of the rib 44 takes place immediately upon the initial movement downwardly of the fingers 58 so that the next-to-lowermost record in the stack will be gripped and held before it has an opportunity to move downwardly with the lowermost record in the stack. It is important to understand that it is the upper portion of the spindle body 22 itself which is expanded to retain the remainder of the record stack, and thus no separate expandable fingers or sleeves or the like are required in addition to the spindle body. The spindle body 22 is rendered sufficiently flexible to permit such expansion because of the vertical slots 38 which extend to the upper end thereof.

In operation, a stack of records R will normally be supported on the upper storage portion of the spindle 20 by the primary record supporting fingers 58 as shown in FIGURE 1, and in this position the ball 82 will be held raised above the shoulder 84 by the rod extension 52 so that the upper portion of the spindle having the annular rib 44 thereon will be collapsed to its normal position. During a record change cycle when it is desired to lower a further record to the turntable 30 for playing, the rack 80 is moved to the left as viewed in FIGURE 1 so as to rotate the drive tube 74, and as the drive tube rotates, the rod 46 is lowered so as to lower the primary supporting fingers 58 and also the rod extension 52. As soon as the rod extension 52 begins its downward movement, the spring 86 moves the ball 82 downwardly against the shoulder 84 so as to expand the upper portion of the spindle body 22 including the external rib 44. The rib 44 is thereby expanded into the periphery of the centerhole of the next-to-lowermost record in the stack so as to retain all but the bottom record on the upper storage portion of the spindle, and in this manner the bottom record is lowered with the fingers 58 as shown in FIGURE 2. If desired, the rack 80 may be stopped momentarily in the position of FIGURE 2 in order to permit sensing of the size of the record being lowered, and thereafter the drive tube 74 continues to lower the rod 46 to the position shown in FIGURE 3.

Because the slots 38 in the spindle body 22 extend all the way down to the turntable 30, the primary supporting fingers 58 will not be cammed inwardly to a retracted position in the spindle body as shown in FIGURE 3 until the record supported on such fingers has been lowered in a controlled manner substantially the entire distance to the turntable. Once the record being lowered has reached the turntable, the fingers 58 will engage the turntable and be cammed inwardly into the spindle body 22 so as to assume the retracted positions shown in FIGURE 9. Such retraction of the fingers 58 will cause the collar 68 to be moved downwardly somewhat against the force of the compression spring 66. Thereafter, the rack 80 will be moved in the opposite direction to raise the threaded rod 46 and fingers 58, and as soon as the fingers 58 have been raised above the record which was last lowered to the turntable the fingers will again be expanded outwardly through the respective slots 38 due to the action of the spring 66 and collar 68. Continued rotation of the drive tube 74 will raise the primary supporting fingers 58 to the original position of FIGURE 1, and in the latter position the rod extension 52 will engage and lift the ball 82 from the shoulder 84 so as to permit the upper spindle body having the rib 44 to collapse and release the remaining stack of records which will then again be supported on the fingers 58.

It will be understood that because the bottom record in the stack is lowered in a controlled manner substantially the entire distance to the turntable 30 by the supporting finger 58, the vertical stroke of the rod 46 is much greater than it would otherwise have to be if the slots 38 were terminated well above the turntable so as to permit the bottom record to be dropped to the turntable rather than lowered thereto in a controlled manner. It is of course an advantage to lower the record to the turntable in a controlled manner rather than drop the same, but at the same time it is also desirable not to greatly increase the overall vertical dimensions of the spindle 20 and associated mechanism. The screw drive including the drive tube 74 and threaded rod 46 is highly advantageous in this respect since it not only provides a smooth reliable drive for the raising and lowering of the fingers 58, but in addition it serves to reduce the overall vertical dimensions of the mechanism due to the telescoping relationship between the drive tube 74 and the rod 46.

While I have illustrated my invention in a preferred form, I do not intend to be limited to that form, since modifications coming within the scope of my invention will be readily suggested to others with my disclosure before them.

I claim:

1. In a record changer spindle of the type which supports a plurality of records on an upper storage portion thereof and releases one record at a time to a turntable for playing, in combination, a spindle body having a plurality of spaced vertical slots therein which extends from adjacent said storage portion to the turntable, a carrier axially slidable in said spindle body and a plurality of record supporting fingers one disposed within each of said slots in said spindle body and pivotally connected to said carrier, said carrier having a plurality of angularly related surfaces each guiding one of said fingers for sliding movement thereon in a respective plane which is parallel to and spaced from a longitudinal axis of said spindle body, and means on each surface above the pivotal connection of the finger to the carrier restricting its movement to between an extended position wherein its upper end projects outwardly of said spindle body through a corresponding one of said slots to stably support a record thereon and a retracted position wherein the finger is contained within said spindle body to release its support of the record, means for lowering said carrier to the turntable with the fingers in their extended position whereby to support and carry a record from the storage portion to the turntable as the carrier is lowered into the turntable, said fingers moving into their retracted position on engagement with the turntable or record supported thereon so as to release the lowered record to the turntable when thereat, and spring means which move with the carrier and engage the lower ends of said fingers so as to be flexed by said fingers when the fingers are moved into their retracted positions, said spring means acting to return the fingers to their extended positions when the carrier is again raised to above the turntable and record thereon.

2. The combination of claim 1 wherein the carrier member has at least three angularly disposed outer planar surfaces in spaced parallel relation about the longitudinal axis of the spindle body, each of said planar surfaces being aligned with a respective one of said vertical slots in the spindle body, and the record supporting fingers each being slidably mounted on a respective one of said planar surfaces.

3. The combination of claim 2 wherein the spindle body has inner planar surfaces each paired in spaced parallel relation with one of said planar surfaces of the carrier member, said paired planar surfaces of the spindle body and carrier member being aligned with opposed side edges of respective ones of said vertical slots, and the record supporting fingers having opposed parallel flat sides in sliding engagement with the respective paired planar surfaces.

4. The combination of claim 1 wherein each said record supporting fingers has a pair of vertically spaced apertures therein, and the carrier member has a pair of vertically spaced studs projecting from each of its surfaces and which are received in the apertures of each finger, the upper one of said studs being smaller than its receiving aperture so as to permit pivoting of the finger on the lower stud which is received in its other aperture.

5. The combination of claim 1 wherein the upper end of the record supporting fingers is of a width greater than the radius of the spindle body and is so angled to the length of the fingers as to lie in a common horizontal plane when the fingers are in their extended positions to provide a substantial solid horizontal supporting shelf about the spindle body.

6. In a record changer spindle of the type having means which supports a stack of records on an upper storage portion thereof as the bottom one of said stack is released therefrom to a turntable for playing, the spindle having a body provided with a plurality of spaced vertical slots therein of a length which extends from said storage portion of the spindle to the turntable, a finger carrier member axially movable within said spindle body between an upper position adjacent said storage portion and a lower position below the turntable, said carrier having a plurality of angularly related planar surfaces in spaced parallel relation to the longitudinal axis of the spindle body, the spindle body having inner planar surfaces each paired in spaced parallel relation with one of said planar surfaces of the carrier and aligned with the opposed side edges of a respective one of the vertical slots, and a plurality of record supporting fingers each disposed within a respective one of said slots and between said pairs of planar surfaces so as to be guided thereby through respective planes which are parallel to and spaced from the longitudinal axis of said spindle body, each said record supporting fingers having a pair of vertically spaced apertures therein, the carrier member having a pair of vertically spaced studs projecting from each of its planar surfaces and which are received in the apertures of each finger, one of said studs being smaller than its receiving apertures so as to permit limited pivoting of the finger on the other stud between an extended position wherein the upper end of said fingers project outwardly of said spindle body through a corresponding one of said slots to support the bottom record of said stack and a retracted position wherein the fingers are contained wholly within said spindle body, said carrier member being vertically movable in said spindle body with the upper end of the fingers projecting through said slots so that the fingers support a record released from the bottom of the stack for lowering it to the turntable with downward movement of the carrier member, said fingers being free to move into their retracted positions within the spindle body when engaged by the turntable or record thereon so as to release the lowered record to the turntable when thereat, and said carrier member having resilient means which are engaged by said fingers so as to return said fingers to their extended positions when the carrier member is thereafter raised above the record released from said fingers to the turntable.

7. In a record changer spindle for mounting centrally of a turntable, in combination, a spindle body having an expandable storage portion at its upper end and three spaced vertical slots therein of a length to extend from said storage portion to at least to the turntable, a finger carrier member axially movably disposed within said spindle body, three record supporting fingers having their lower ends disposed within said spindle body and pivotally mounted on said carrier, said carrier member having a plurality of angularly related surfaces each guiding one of said fingers for sliding movement therealong in three respective planes which intersect one another and each of which is parallel to and spaced from a longitudinal axis of said spindle body, and means on each said surfaces above the pivotal connection of the fingers to the carrier member restricting its movement to between an extended position wherein its upper end projects outwardly of said spindle body through a corresponding one of said slots to stably support a record thereon and a retracted position wherein its upper end is fully contained within said spindle body to release its support of the record, and said carrier having pintle projections projecting from each said related surfaces which engage within larger diametered apertures in the fingers to limit the outward movement of said fingers and define the extended position of their upper ends, said upper ends of the fingers being so angled and having a width greater than the width of the radius of the spindle body so as to constitute a record supporting shelf which extends inwardly at least approximately to said spindle body when said fingers are in their extended position as limited by said pins, a vertically movable collar disposed immediately beneath and engaging the lower ends of said fingers, and spring means carried by said carrier which yieldingly urge said collar upwardly to bias said fingers toward their extended pivotal positions, said spring means yielding so as to permit the fingers to be moved into retracted positions to release a record when the fingers are lowered with the carrier to the turntable.

8. In a record changer spindle of the type which supports a plurality of records on an upper storage portion of the spindle and releases one at a time to a turntable for playing, the improvement comprising, in combination, a spindle body having a plurality of spaced vertical slots therein which extend from an upper storage portion of the spindle down approximately to the level of said turntable, a first threaded member disposed within said spindle body and vertically movable therein, a plurality of record supporting fingers carried on said first threaded member for vertical movement therewith, said fingers also being movable relative to said first threaded member between extended positions wherein they project outwardly of said spindle body through corresponding ones of said slots and retracted positions wherein they are contained within said spindle body, a second threaded member which is rotatable with respect to said spindle body and is in threaded engagement with said first threaded member, the first threaded member being held against rotation with respect to the spindle body, and means for rotating said second threaded member to drive said first threaded member and said supporting fingers upwardly and downwardly relative to said spindle body, the latter downward movement serving to lower a record from said upper storage portion of said spindle approximately the entire distance to said turntable while under the control of said supporting fingers.

9. In a record changer spindle of the type which supports a plurality of records on an upper storage portion of the spindle and releases one at a time to a turntable for playing, the improvement comprising, in combination, a spindle body having a plurality of spaced vertical slots therein which extend from an upper storage portion of the spindle down approximately to the level of said turntable, a threaded rod disposed within said spindle body and vertically movable therein, a finger carrier proximate the upper end of said threaded rod for vertical movement therewith, a plurality of record supporting fingers mounted on said carrier for vertical movement therewith, said fingers also being movable relative to said carrier between extended positions wherein they project outwardly of said spindle body through corresponding ones of said slots and retracted positions wherein they are contained within said spindle body, a rotatable internally threaded drive tube disposed within said spindle body proximate the lower end thereof, said drive tube being positioned to receive said threaded rod so as to be in threaded engagement therewith, said threaded rod being held by the fingers within the slots against rotation with respect to the spindle body, a pinion at the lower end of said drive tube, and means for driving said pinion to rotate said drive tube with respect to the spindle body and thereby drive said threaded rod and said supporting fingers upwardly and downwardly relative to said spindle body, the latter downward movement serving to lower a record from said upper storage portion of said spindle approximately the entire distance to said turntable while under the control of said supporting fingers.

10. In a record changer spindle of the type which supports a plurality of records on an upper storage portion of the spindle and releases one at a time to the turntable for playing, the improvement comprising, in combination, a spindle body having a plurality of spaced vertical slots therein which extend from an upper storage portion of the spindle down approximately to the level of said turntable, a first threaded member disposed within said spindle body and vertically movable therein, a plurality of record supporting fingers, one for each of said slots, carried on said first threaded member for vertical movement therewith, said fingers each being positioned in a respective plane which is parallel to and spaced from a longitudinal axis of said spindle body and each finger being movable in its corresponding plane relative to said first threaded member between an extended position wherein it projects outwardly of said spindle body through a corresponding one of said slots and a retracted position wherein it is contained within said spindle body, a second threaded member which is rotatable with respect to the spindle body and is in threaded engagement with said first threaded member, the first threaded member being held against rotation with respect to said spindle body, and means for rotating said second threaded member to drive said first threaded member and said supporting fingers upwardly and downwardly relative to said spindle body, the latter downward movement serving to lower a record from said upper storage portion of said spindle approximately the entire distance to said turntable while under the control of said supporting fingers.

11. In a record changer spindle of the type which supports a plurality of records on an upper storage portion of the spindle and releases one at a time to a turntable for playing, the improvement comprising, in combination, a spindle body having a plurality of spaced vertical slots therein which extend from an upper storage portion of the spindle down approximately to the level of said turntable, a first threaded member disposed within said spindle body and vertically movable therein, a finger carrier proximate the upper end of said first threaded member for vertical movement therewith, a plurality of record supporting fingers pivotally mounted on said carrier for vertical movement therewith, said fingers each being positioned in a respective plane which is parallel to and spaced from a longitudinal axis of said spindle body and each finger being pivotally movable in its corresponding plane relative to said first threaded member between an extended position wherein it projects outwardly of said spindle body through a corresponding one of said slots and a retracted position wherein it is contained within said spindle body, each of said fingers further being provided at its upper end with a substantially solid record supporting shelf of such a width that said shelf will extend inwardly at least approximately to said spindle body when said finger is in said extended position, a second threaded member which is rotatable with respect to the spindle body and is in threaded engagement with said first threaded member, the first threaded member being held against rotation with respect to said spindle body and means for rotating said second threaded member to drive said first threaded member and said supporting fingers upwardly and downwardly relative to said spindle body, the latter downward movement serving to lower a record from said upper storage portion of said spindle approximately the entire distance to said turntable while under the control of said supporting fingers.

12. In a record changer spindle of the type having primary record supporting means which normally supports a stack of records on the spindle and which is withdrawn to an inoperative position in order to release the lowermost record in the stack to a turntable for playing, the improvement comprising secondary record supporting means for supporting the remaining stack of records on an upper storage portion of the spindle when the primary record supporting means is withdrawn to release the lowermost record, said secondary record supporting means including, in combination, a spindle body having an upper record storage portion which is radially expandable and contractible, said upper storage portion being hollow and including a section of reduced internal diameter, a ball disposed within the upper storage portion of said spindle body having a diameter greater than the internal diameter of said section, spring means located within said storage portion for urging said ball downwardly into said section so as to radially expand said storage portion, and actuator means which move downwardly with withdrawal of said primary record supporting means, said actuator means normally holding the ball in a position above said section of reduced internal diameter against the action of the spring whereby the spring urges the ball into said section of reduced internal diameter to expand said upper storage portion of said spindle body into supporting engagement with the next-to-lowermost record in a stack of records disposed thereon when the actuator means moves downwardly.

13. In a record changer spindle of the type having primary record supporting means which normally supports a stack of records on the spindle and which is withdrawn to an inoperative position in order to release the lowermost record in the stack to a turntable for playing, the improvement comprising secondary record supporting means for supporting the remaining stack of records on an upper storage portion of the spindle when the primary record supporting means is withdrawn to release the lowermost record, said secondary record supporting means including, in combination, a spindle body having an upper storage portion integral therewith, said upper storage portion of the spindle having a plurality of spaced vertical slots therein, said slotted upper storage portion of said spindle body being thereby radially expandable and contractible, and a ball disposed within said slotted upper storage portion of said spindle body and movable between an inoperative position wherein it permits said upper storage portion of said spindle body to contract and an operative position wherein it expands said upper storage portion of said spindle body into supporting engagement with the next-to-lowermost record in a stack of records disposed thereon.

14. The invention of claim 13 wherein said upper storage portion of the spindle body at the interior thereof is provided with a reduced diameter portion which is engageable by said ball in order to expand said upper storage portion of said spindle body when said ball is moved to its operative position.

15. The invention of claim 14 wherein spring means is provided within the upper end of said spindle body for yieldingly urging said ball towards its operative position.

16. The invention of claim 14 wherein an annular projecting rib is formed externally on the slotted upper storage portion of said spindle body, said rib being disposed at the height of the next-to-lowermost record in a stack of records supported on said spindle by said primary supporting means whereby when said upper storage portion of said spindle body is expanded said rib will engage the periphery of the centerhole of said next-to-lowermost record to support the same.

17. In a record changer spindle of the type having primary record supporting means which normally supports a stack of records on the spindle and which is withdrawn to an inoperative position in order to release the lowermost record in the stack to a turntable for playing, the improvement comprising secondary record supporting means for supporting the remaining stack of records on an upper storage portion of the spindle when the primary record supporting means is withdrawn to release the lowermost record, said secondary record supporting means including, in combination, a spindle body having an upper storage portion with a plurality of spaced vertical slots therein, said slotted upper storage portion of said spindle body being radially expandable and contractible and being integral with the remainder of the spindle body, a reduced diameter portion formed at the interior of said upper storage portion of said spindle body, a ball disposed within said upper storage portion of said spindle and movable between an upper inoperative position wherein it permits said upper storage portion of said spindle body to contract and a lower operative position wherein it engages said reduced diameter portion and expands said upper storage portion of said spindle body, spring means provided within the upper end of said spindle body for yieldingly urging said ball downwardly toward its operative position, an annular projecting rib formed externally on the slotted upper storage portion of said spindle body and disposed at the height of the next-to-lowermost record in a stack of records supported on said spindle by said primary supporting means whereby when said upper storage portion is expanded said rib will engage the periphery of the centerhole of said next-to-lowermost record to support the same, and means for moving said ball upwardly to its inoperative position against the force of said spring means.

References Cited

UNITED STATES PATENTS

| | | |
|---|---|---|
| 1,834,389 | 12/1931 | Drescher. |
| 2,626,157 | 1/1953 | Jablonski. |
| 3,021,144 | 2/1962 | Harnisch et al. |
| 3,023,008 | 2/1962 | Ansar. |
| 3,083,022 | 3/1963 | Hansen. |
| 3,279,797 | 10/1966 | Goulding. |
| 3,289,301 | 12/1966 | Hanson -------------- 33—93 |

FOREIGN PATENTS

| | | |
|---|---|---|
| 1,135,822 | 12/1956 | France. |

HARRY N. HAROIAN, *Primary Examiner.*